3,406,186
5 - HYDROXY - 10,5 - (EPOXYMETHANO) - 10,11-
DIHYDRO - 5H - DIBENZO[a,d]CYCLOHEPTEN-
13 - ONE AND PROCESS FOR PREPARATION
THEREOF
Martin A. Davis, Montreal, Quebec, and Thomas A. Dobson, St. Laurent, Quebec, Canada, assignors to American Home Products Corporation, New York, N.Y., a corporation of Delaware
No Drawing. Filed May 23, 1966, Ser. No. 551,948
2 Claims. (Cl. 260—343.2)

ABSTRACT OF THE DISCLOSURE

The compound, 5-hydroxy-10,5-(epoxymethano)-10,11-dihydro - 5H - dibenzo[a,d]cyclohepten-13-one, and a process for its preparation which comprises cyclizing by heat the prepared 10-bromo derivative of 5-hydroxy-10,11-dihydro-5H-dibenzo[a,d]cycloheptene - 5 - carboxylic acid methyl ester are disclosed. The new compound has important biological properties including anticonvulsant, anti-bacterial, central depressant and skeletal muscle relaxant activity. Dosage forms of the compound when orally administered as an anti-convulsant agent and for the treatment of disorders characterized by central excitation or muscle rigidity are described.

---

This invention relates to a novel chemical compound having useful biological properties. More particularly this invention relates to 5-hydroxy-10,5-(epoxymethano)-10,11-dihydro - 5H - dibenzo[a,d]cyclohepten-13-one of the structural Formula I:

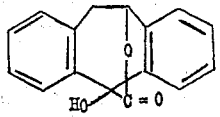

The compound of this invention is prepared by reacting 5 - hydroxy - 10,11 - dihydro - 5H - dibenzo[a,d]cycloheptene-5-carboxylic acid methyl ester with a free-radical brominating agent, such as, for example, an N-bromoimide in an inert solvent, thus introducing a bromine atom in position 10. The intermediate bromo derivative is, however, not isolated but is immediately converted to the desired 5 - hydroxy - 10,5 - (epoxymethano) - 10,11 - dihydro-5H-dibenzo[a,d]cyclohepten-13-one by heating the initial reaction mixture.

More specifically, the compound of this invention may be conveniently secured in the following manner. A stirred mixture of 5 - hydroxy - 10,11 - dihydro - 5H - dibenzo-[a,d]cycloheptene-5-carboxylic acid methyl ester of Formula III, N-bromosuccinimide and a little benzoyl peroxide in an inert solvent, such as, for example, carbon tetrachloride, is irradiated with an incandescent lamp, of the type commonly referred to as a heat lamp. This serves to introduce a bromine atom into the 10-position of the ring system. The mixture is then heated at an elevated temperature, preferably at the boiling point of the solvent for a period of time in the range of from one to three hours. Trans-annular lactonisation occurs with the formation of Compound I. This in turn is isolated by prior removal of the succinimide by filtration and removal of the solvent. The product may be purified by conventional methods, such as, for example, chromatography on a suitable adsorbent from an appropriate solvent. Final purification may be effected through recrystallization.

The methyl ester of Formula III used as starting material may be secured as described by M. A. Davis et al. in the Journal of Medicinal Chemistry, vol. 6, page 513 (1963). Briefly, this process involves the treatment of 10,11-dihydro-5H-dibenzo[a,d]cyclohepten-5-one of Formula II with metallic sodium, either in liquid ammonia-ether mixture or in 1,2-dimethoxyethane, followed by carboxylation with carbon dioxide. The resulting carboxylic acid, liberated by the addition of a suitable organic or mineral acid, is then treated with an ethereal solution of diazomethane to furnish the desired ester.

Alternatively, a simplified and improved procedure is based on reactions described by S. Selman et al. in Journal of Organic Chemistry, vol. 30, p. 3804 (1965). In this procedure the di-sodio adduct of the ketone is interacted with dimethyl carbonate to give directly, and in good yield, the desired methyl ester.

The compound of this invention has valuable biological properties and is useful as a medicament. In mammals at doses considerably below causing toxic manifestations it raises the threshold to supramaximal electroshock and is useful as an anticonvulsant agent. For this purpose the compound may be administered orally as dry powder capsules or compressed tablets containing from 25 to 300 mg. of the active ingredient, such capsules or tablets being given from once to four times daily.

The compound further posesses antibacterial activity against both gram-positive and gram-negative organisms and additionally has trichomonicidal effects against the organism T. vaginalis.

The compound also posesses central depressant and skeletal muscle relaxant properties and may be used to treat disorders characterized by central excitation or muscle rigidity. For these purposes it may be administered orally in doses ranging from 100 to 500 mg. per day.

The following formulae and examples will illustrate this invention:

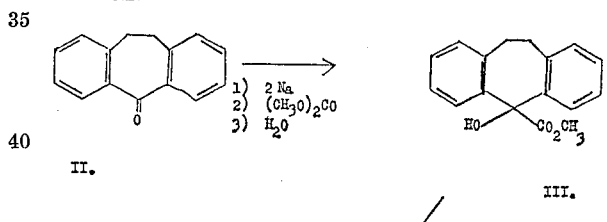

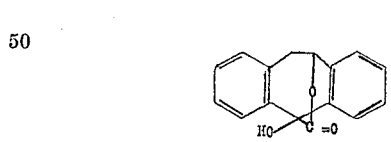

Example 1

A solution of 10,11-dihydro-5H-dibenzo[a,d]cyclohepten-5-one (41.6 g., 0.2 mole) in dry 1,2-dimethoxyethane (150 ml.) is added dropwise to a stirred suspension of sodium (11 g., 0.5 g. atom) in the same solvent (70 ml.). The stirring is continued for 4 hours and a solution of dimethyl carbonate (20.0 g., 0.22 mole) in dry ether (150 ml.) is added gradually. An additional 150 ml. of ether is added to dilute the reaction mixture and it is allowed to stand overnight. Water is cautiously added to hydrolyse the intermediate and to destroy the excess of sodium. The organic layer is separated and combined with ethereal extracts of the aqueous layer. This solution is in turn extracted with water, dried and evaporated and the residual solid is recrystallized from a mixture of carbon tetrachloride and hexane. 5-hydroxy-10,11-dihydro-5H-dibenzo[a,d]-cycloheptene-5-carboxylic acid methyl ester, M.P. 135–137° C. is thus obtained.

Example 2

A stirred mixture of the ester obtained as described in Example 1 (6.0 g., 0.022 mole), N-bromosuccinimide (4.3 g., 0.024 mole) and a pinch of benzoyl peroxide in carbon tetrachloride (150 ml.) is irradiated with a heat lamp for one-half hour during which time a light brown colour develops. The lamp is removed and the mixture is then heated under reflux for 1.5 hours. The colour gradually disappears. The mixture is filtered and the solvent is removed under reduced pressure. The residual yellow oil, dissolved in benzene, is applied to a column of silica gel (200 g.). Elution with benzene gives in the first fraction some side-products while continued elution either with benzene or with 25% chloroform in benzene solution then gives the desired 5-hydroxy-10,5-(epoxymethano)-10,11-dihydro-5H-dibenzo[a,d]cyclohepten-13-one as a crystalline material. Recrystallization from carbon tetrachloride-hexane with a little decolourising charcoal furnishes a pure sample M.P. 130–131° C. The structure is supported by the infrared spectrum (lactone carbonyl at 1740 cm.$^{-1}$ and hydroxyl at 3525 cm.$^{-1}$) and by the NMR spectrum which shows peaks at 2.1, 2.8, 4.32, 5.75 and 6.62 $\tau$. Elemental analysis confirms the empirical formula $C_{16}H_{12}O_3$.

We claim:
1. 5 - hydroxy - 10,5 - (epoxymethano) - 10,11 - dihydro-5H-dibenzo[a,d]cyclohepten-13-one.
2. The process of preparing 5-hydroxy-10,5-(epoxymethano) - 10,11 - dihydro - 5H - dibenzo[a,d]cyclohepten-13-one which comprises treating 5-hydroxy-10,11-dihydro-5H-dibenzo[a,d]cycloheptene-5-carboxylic acid methyl ester in an inert solvent with N-bromosuccinimide in the presence of benzoyl peroxide and incandescent heat lamp irradiation, thus introducing a bromine atom in position-10, and then heating said reaction mixture to convert said bromine-containing intermediate product to the desired compound.

References Cited

UNITED STATES PATENTS 3,306,914　2/1967　McNelis _____ 260—343.2

JAMES A. PATTEN, *Primary Examiner.*